(12) United States Patent
Pursifull

(10) Patent No.: US 8,640,680 B2
(45) Date of Patent: Feb. 4, 2014

(54) EFFICIENT VACUUM FOR A VEHICLE

(75) Inventor: Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 8 days.

(21) Appl. No.: 13/612,488

(22) Filed: Sep. 12, 2012

(65) Prior Publication Data
US 2013/0000593 A1 Jan. 3, 2013

Related U.S. Application Data

(62) Division of application No. 12/917,862, filed on Nov. 2, 2010, now Pat. No. 8,267,072.

(51) Int. Cl.
*F01M 13/04* (2006.01)

(52) U.S. Cl.
USPC .............. 123/572; 123/198 C; 180/65.21

(58) Field of Classification Search
USPC ............ 123/572–574, 198 C, 196 R; 60/397; 180/65.21, 313
See application file for complete search history.

(56) References Cited

U.S. PATENT DOCUMENTS

| | | | |
|---|---|---|---|
| 3,991,854 A | 11/1976 | Tilley | |
| 4,328,669 A * | 5/1982 | Mort | 60/397 |
| 4,332,302 A | 6/1982 | Kosmanski | |
| 4,356,805 A * | 11/1982 | Kler | 123/557 |
| 4,412,416 A | 11/1983 | Van House | |
| 4,491,094 A | 1/1985 | Ogawa | |
| 4,738,112 A | 4/1988 | Nomura et al. | |
| 5,501,190 A | 3/1996 | Okubo et al. | |
| 5,511,523 A | 4/1996 | Masuda | |
| 5,676,101 A | 10/1997 | Kawai et al. | |
| 5,836,280 A * | 11/1998 | Miyazawa | 123/193.4 |
| 5,910,098 A | 6/1999 | Harima | |
| 5,918,573 A | 7/1999 | Killion | |
| 6,019,585 A | 2/2000 | Abelen et al. | |
| 6,079,629 A | 6/2000 | Morikawa et al. | |
| 6,343,572 B1 | 2/2002 | Pfaff et al. | |
| 7,086,366 B1 | 8/2006 | Killion | |
| 7,520,734 B2 | 4/2009 | Luedtke et al. | |
| 7,674,096 B2 | 3/2010 | Sundheim | |
| 2002/0174653 A1 | 11/2002 | Uzkan | |
| 2003/0019473 A1 | 1/2003 | Wild et al. | |
| 2003/0172891 A1 | 9/2003 | Suzuki | |
| 2003/0213454 A1 | 11/2003 | Grieser et al. | |
| 2004/0103889 A1* | 6/2004 | Akiyama et al. | 123/572 |
| 2004/0112346 A1* | 6/2004 | Ahlborn et al. | 123/572 |
| 2004/0134459 A1* | 7/2004 | Korenjak et al. | 123/195 R |
| 2006/0070601 A1* | 4/2006 | Korenjak et al. | 123/196 R |
| 2011/0174244 A1 | 7/2011 | Maki et al. | |

FOREIGN PATENT DOCUMENTS

| | | |
|---|---|---|
| DE | 4107049 A1 | 9/1992 |
| EP | 0119135 A1 * | 3/1984 |
| JP | 57000320 A * | 1/1982 |
| JP | 10252435 A * | 9/1998 |

* cited by examiner

*Primary Examiner* — Rinaldi Rada
*Assistant Examiner* — Hung Q Nguyen
(74) *Attorney, Agent, or Firm* — Julia Voutyras; Alleman Hall McCoy Russell & Tuttle LLP

(57) ABSTRACT

An engine with an efficient selectively operable vacuum source is disclosed. In one example, an electric vacuum pump with oil wetted seals provides vacuum to a vehicle vacuum reservoir while exhausting air to an interior region of the engine, such as the crankcase. The approach may provide for improved efficiency when generating vacuum.

13 Claims, 4 Drawing Sheets

EFFICIENT VACUUM FOR A VEHICLE

CROSS REFERENCE TO RELATED APPLICATIONS

The present application is a divisional of U.S. patent application Ser. No. 12/917,862 filed Nov. 2, 2010, the entire contents of which are incorporated herein by reference for all purposes.

BACKGROUND/SUMMARY

Vacuum may be used to operate or to assist in the operation of various devices of a vehicle. For example, vacuum may be used to assist a driver applying vehicle brakes. In some vehicle systems vacuum is provided via a vacuum pump. Some vacuum pumps are electrically driven by motors while others are mechanically driven by the vehicle's engine. Engine driven vacuum pumps can operate at higher efficiencies than electrically driven vacuum pumps; however, operation of mechanically driven vacuum pumps is constrained by engine operation. For example, mechanically driven vacuum pumps do not pump air while the engine is not rotating. On the other hand, electrically driven vacuum pumps may be activated and deactivated without regard to engine operation so that engine fuel economy can be increased; however, electrically driven vacuum pumps can be less efficient than mechanically driven vacuum pumps. Thus, opportunities exist to improve on the operation of both electrically and mechanically driven vacuum pumps.

The inventor herein has recognized the above-mentioned disadvantages and has developed an engine vacuum system, comprising: an engine; an electrically driven vacuum pump in fluid communication with the engine and a vacuum reservoir, a vacuum pump exhaust port of the electrically driven vacuum pump in fluid communication with an interior region of a crankcase or cylinder head valve cover of the engine.

By directing the outlet of an electrically driven vacuum pump to an area interior to an engine, it is possible to use engine oil lubricate the mechanism and to wet the pumping chamber seals of an electrically driven pump so that the pump has higher pumping efficiency without increasing vehicle emissions. For example, air can be pumped on demand from a vacuum reservoir by an electrically driven vacuum pump to an engine crankcase. Oil used to wet seals of the vacuum pump can be deposited into the engine crankcase, and air from the vacuum reservoir can be routed to engine cylinders via a positive crankcase ventilation (PCV) system for participation in combustion of an air-fuel mixture. In this way, the pumping efficiency of the electrically driven vacuum pump can be increased without increasing engine emissions. In other examples, air exhausted from an engine driven vacuum pump with an oil wetted pumping chamber can be routed to a region of the engine enclosed by a cylinder head valve cover to reduce vehicle emissions. The valve covers enclose the valve train and limit the flow of oil and other substances to atmosphere.

The present description may provide several advantages. In particular, the approach can improve the operation of electrically and engine (mechanically) driven vacuum pumps that have oil wetted seals. Further, the approach can reduce vehicle emissions for vehicles that have vacuum pumps. Further still, the approach may provide improved vacuum pump control during some conditions.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
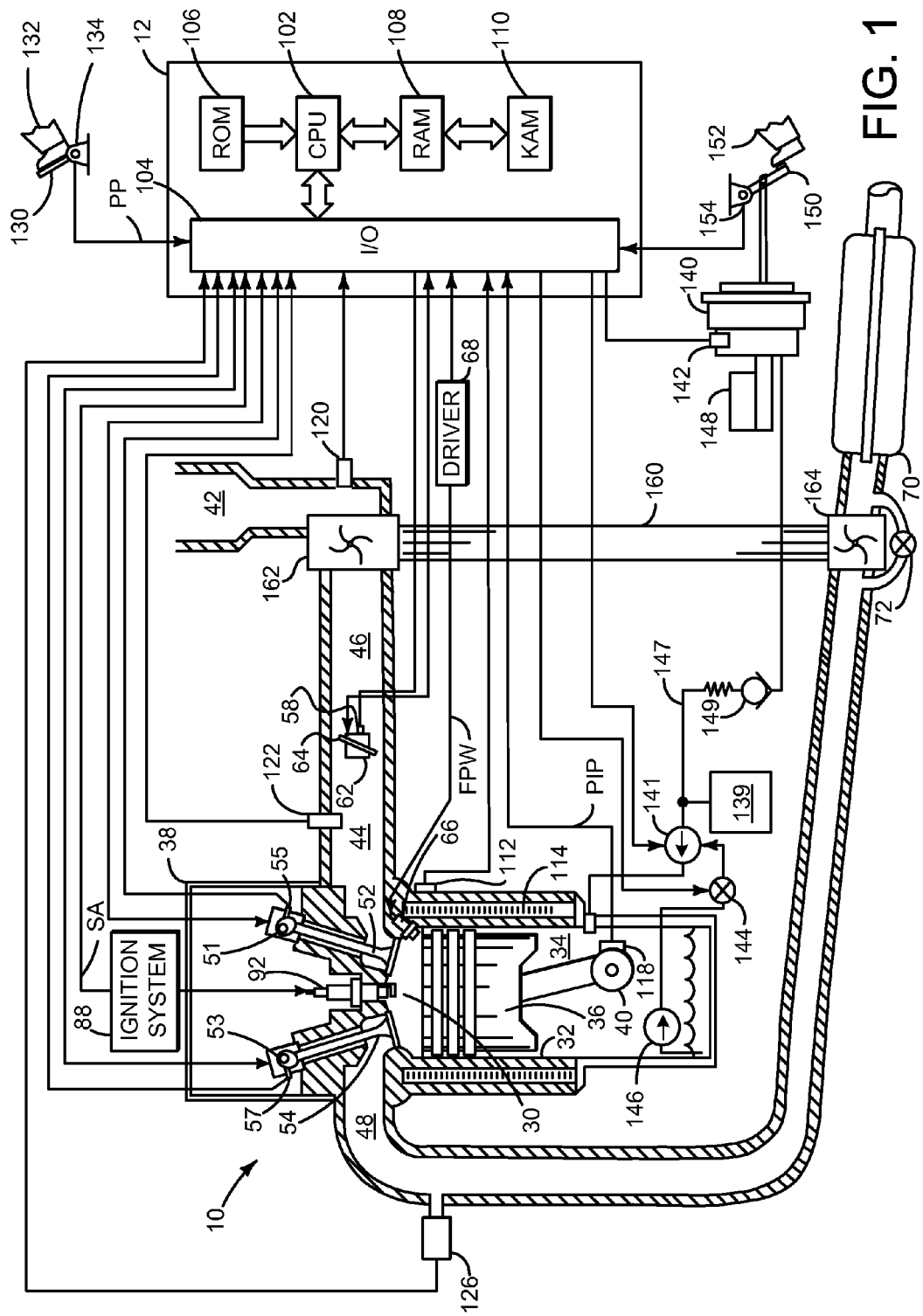
FIG. 1 shows a schematic depiction of an engine.
Figure 2:
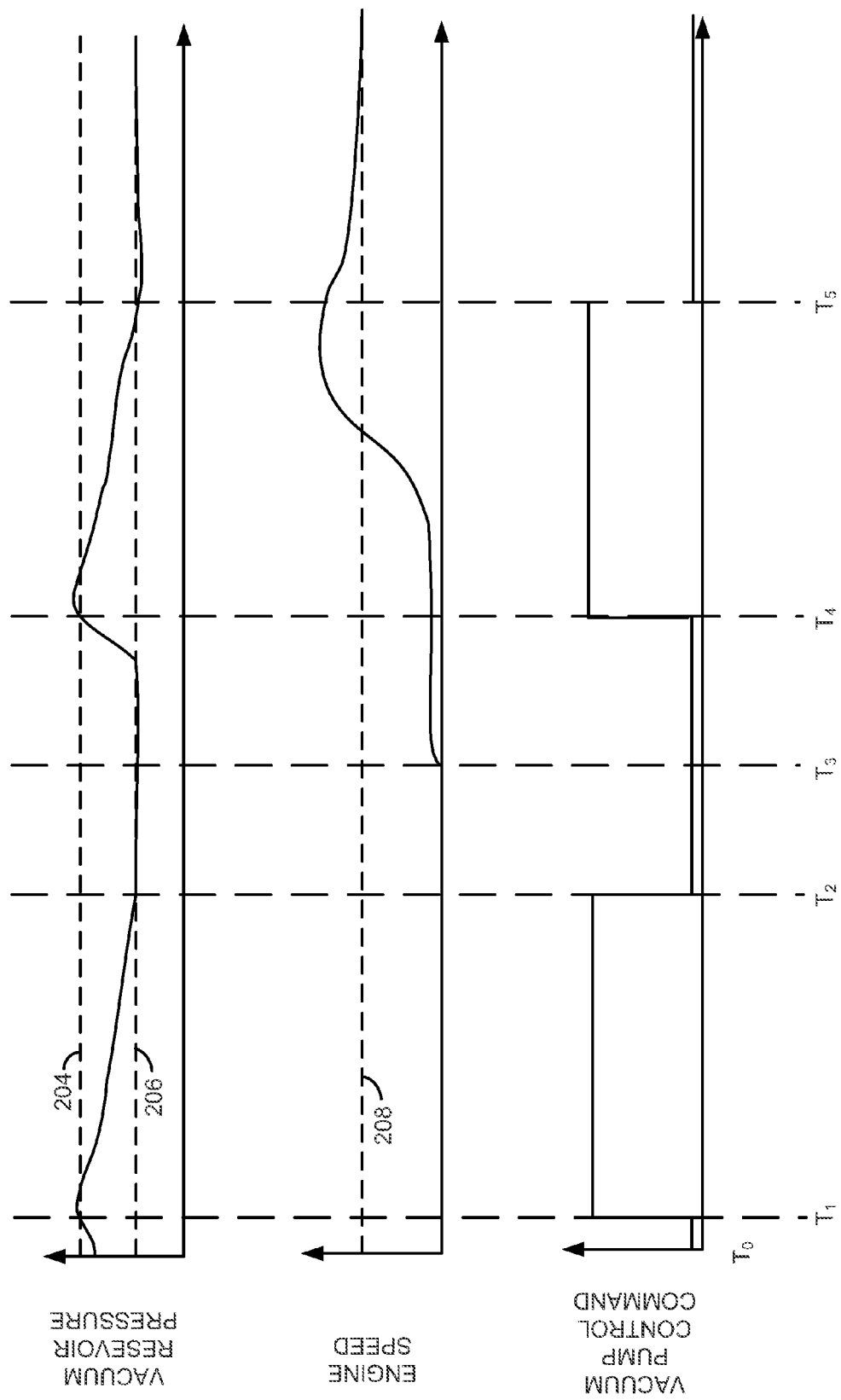
FIG. 2 shows simulated signals of interest during engine operation.

The present description is related to producing vacuum for use as a medium to assist in actuator operation. FIG. 1 shows one example system for producing vacuum used to assist actuator operation. FIG. 2 shows simulated signals of interest when controlling vacuum within a reservoir that supplies power to assist in actuator operation according to the methods of FIGS. 3 and 4.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57. Intake valve 52 and exhaust valve 54 are enclosed within cylinder head valve cover 38 which may be sealed from atmosphere. Crankshaft 40 is located within crankcase 34 as is engine oil pump 146. Engine oil pump supplies engine oil for lubricating intake valve 52, exhaust valve 54, intake cam 51, exhaust cam 53, and vacuum pump 141. Valve 144 is electrically activated and deactivated by controller 12 and selectively allows oil to flow from engine 10 to vacuum pump 141. In other examples, engine oil may be supplied to vacuum pump 141 via gravity feed. For example, oil pump 146 can supply oil to intake cam 51 and exhaust cam 53. Oil may be returned from intake cam 51 and exhaust cam 53 to crankcase 34 through vacuum pump 141 via a conduit (not shown). In still other examples, vacuum pumps are capable of drawing their own lubricating and sealing oil from the engine oil sump.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from intake boost chamber 46 to intake manifold 44.

Compressor 162 draws air from air intake 42 to supply boost chamber 46. Exhaust gases spin turbine 164 which is coupled to compressor 162 via shaft 160. Vacuum operated waste gate actuator 72 allows exhaust gases to bypass turbine 164 so that boost pressure can be controlled under varying operating conditions. Vacuum is supplied to waste gate actuator 72 via vacuum reservoir 139 by way of a conduit (not shown). Vacuum may also be supplied to a vacuum actuated compressor bypass valve. Vacuum pump 141 provides vacuum to brake booster 140 via conduit 147. Check valve 149 limits air flow from vacuum pump 141 to brake booster 140 and allows air flow from brake booster 140 to vacuum pump 141. Additional vacuum capacity is provided by vacuum reservoir 139. Brake booster 140 includes an internal vacuum reservoir and it amplifies force provided by foot 152 via brake pedal 150 to master cylinder 148 for applying vehicle brakes (not shown).

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a position sensor 154 coupled to brake pedal 150 for sensing brake pedal position, a pressure sensor 142 for sensing brake booster vacuum; a knock sensor for determining ignition of end gases (not shown); a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

Thus, the system of FIG. 1 provides for an engine vacuum system, comprising: an engine; an electrically driven vacuum pump in fluid communication (e.g., air and oil) with the engine and a vacuum reservoir, a vacuum pump exhaust port of the electrically driven vacuum pump in fluid communication with an interior region of a crankcase or cylinder head valve cover of the engine. The engine vacuum system includes where the electrically driven vacuum pump is located inside the engine. The engine vacuum system includes where the vacuum pump is located external of the engine. The engine vacuum system further comprises a conduit configured to carry engine oil from the engine to the electrically driven vacuum pump. The engine vacuum system further comprises a control valve located along the length of the conduit. The engine vacuum system further comprises a conduit, the conduit coupling the electrically driven vacuum pump to a vacuum reservoir and a check valve. The engine vacuum system further comprises a controller, the controller including instructions to activate and deactivate the electrically driven vacuum pump in response to an air pressure within the vacuum reservoir. The engine vacuum system further comprises additional instructions for judging whether or not to start the vacuum pump during a start of the engine.

The system of FIG. 1 also provides for an engine vacuum system, comprising: an engine; a vacuum pump configured to exhaust pumped air to an interior region of a crankcase or cylinder valve cover of the engine. The engine vacuum system includes where the vacuum pump is an electrically driven vacuum pump lubricated with engine oil. The engine vacuum system further comprises a conduit, the conduit coupling the vacuum pump to an engine oil pump. The engine vacuum system further comprises a controller, the controller including instructions to selectively activate the vacuum pump. The engine vacuum system further comprises a conduit coupling an air output port of the vacuum pump to the crankcase or cylinder valve cover. The engine vacuum system further comprises a conduit coupling an air inlet port of the vacuum pump to a vacuum reservoir or a vacuum consumer (e.g., brake booster or waste gate actuator).

Figure 3:
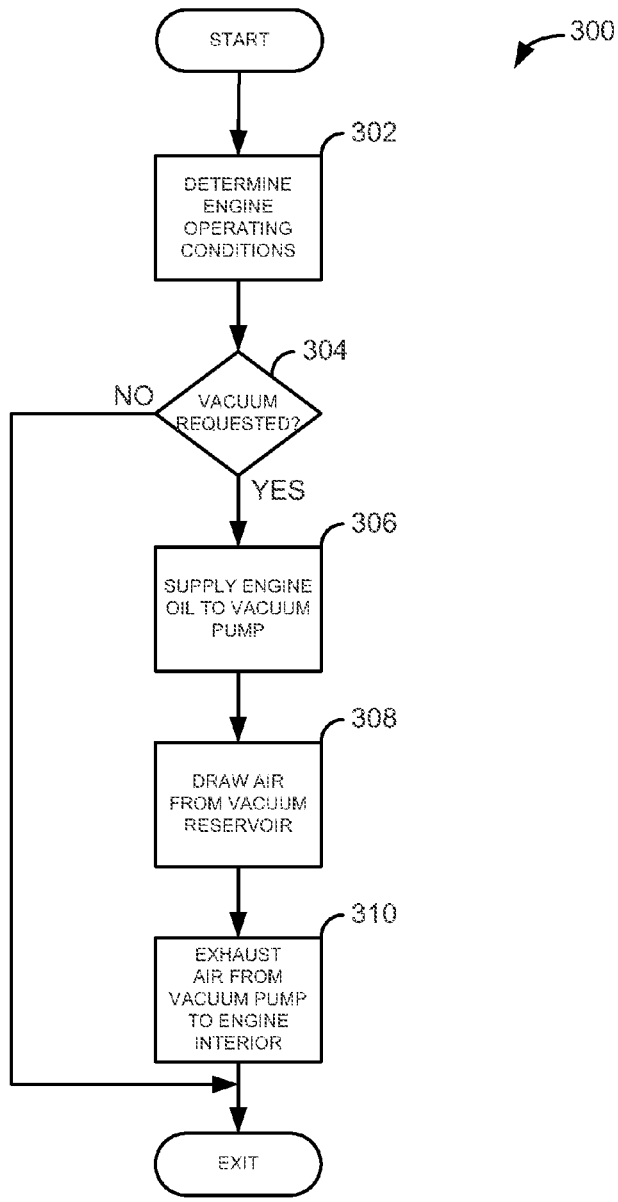
FIG. 3 shows a high level flowchart of a method for operating of a vacuum pump.
Figure 4:
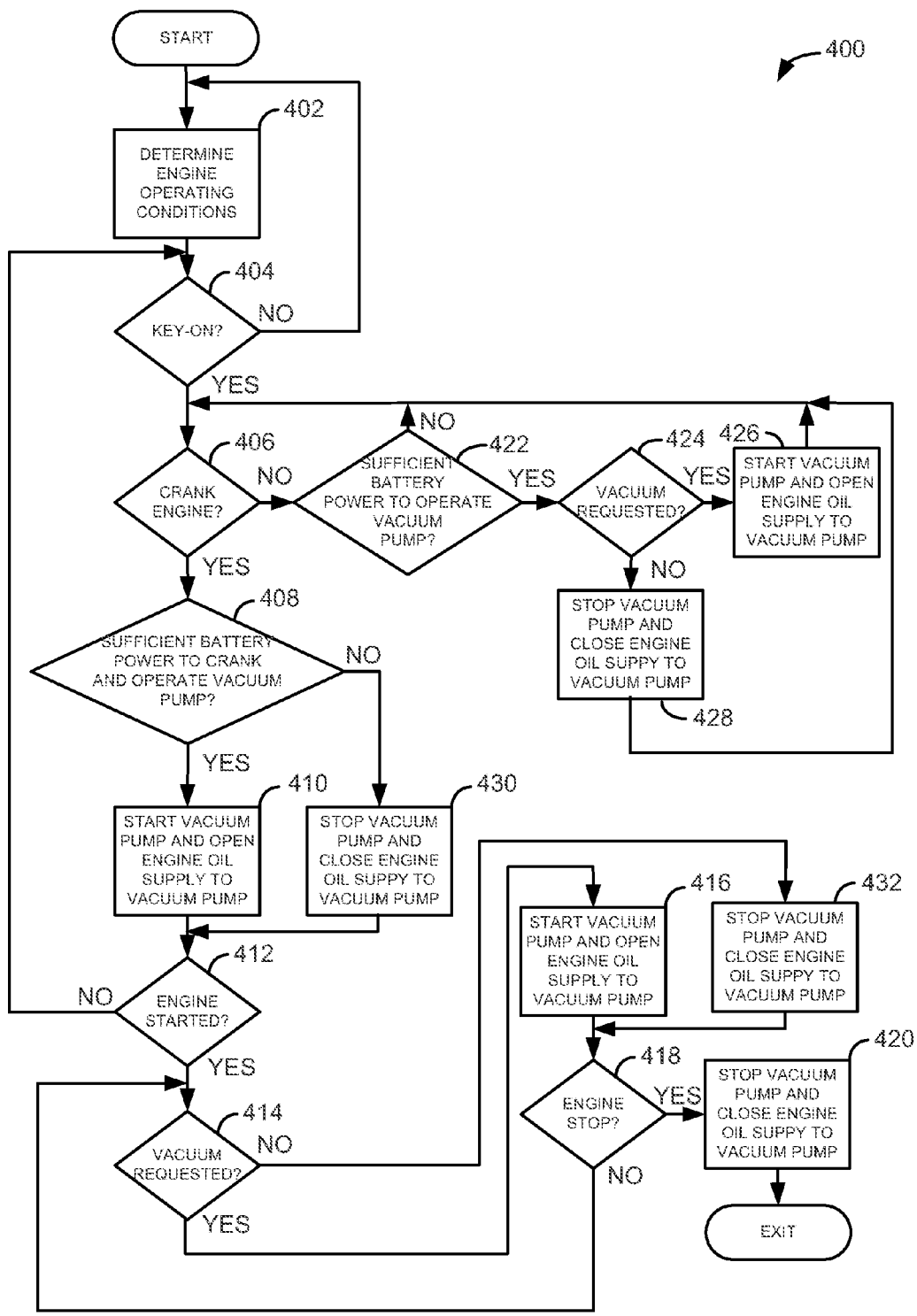
FIG. 4 shows a flowchart of a method for operating a vacuum pump during selected engine operating conditions.

Referring now to FIG. 2, simulated signals of interest during engine operation are shown. Vertical markers $T_0$-$T_5$ identify particular times of interest during the operating sequence. Similar signals may be observed when the methods of FIGS. 3-4 are executed by controller 12 of FIG. 1.

The first plot from the top of FIG. 2 shows vacuum reservoir pressure versus time. Time starts at the left side of the plot and increases to the right. Horizontal marker 204 represents a second threshold level of vacuum reservoir pressure. Horizontal marker 206 represents a first threshold level of vacuum reservoir pressure. Vacuum reservoir vacuum is at a higher level of vacuum at the bottom of the plot. The presence of low pressure translates to a high vacuum.

The second plot from the top of FIG. 2 shows engine speed versus time. Time starts at the left side of the plot and increases to the right. Engine speed is at its lowest value at the bottom of the plot and increases toward the top of the plot. Horizontal marker 208 represents a desired engine idle speed. Desired engine idle speed can vary with engine operating conditions such as engine coolant temperature and time since engine start.

The third plot from the top of FIG. 2 shows a vacuum pump control command (e.g. vacuum pump 141 of FIG. 1). Time starts at the left side of the plot and increases to the right. The vacuum pump control is on when the signal is near the top of the plot, and the vacuum pump control is off when the signal is near the bottom of the plot.

At time $T_0$, vacuum reservoir pressure is at a higher level and is increasing. Vacuum reservoir pressure may increase in response to use of a vacuum operated actuator. For example, vacuum reservoir pressure can increase when vehicle brakes are applied and released. Vacuum reservoir pressure can also increase when vacuum is used to operate a turbocharger waste gate or other vacuum operated actuator. Further, vacuum pressure can also increase when air seeps by check valves or other components that are used to maintain vacuum level. Engine speed is zero at time $T_0$ and indicates that the engine is not operating. The vacuum pump control command is also at a low level indicating that the vacuum pump is initially turned off.

At time $T_1$, vacuum reservoir pressure exceeds the second threshold pressure level 204 of vacuum reservoir pressure. When vacuum reservoir pressure exceeds the second threshold pressure level, the vacuum pump is commanded on. By commanding the vacuum pump on, air is evacuated from the vacuum reservoir so that pressure in the vacuum reservoir can be decreased. Air evacuated from the vacuum reservoir via the vacuum pump is exhausted by the vacuum pump to an interior region of the engine. In one example, air is exhausted from the vacuum pump to the engine crankcase. In another example, air is exhausted from the vacuum pump to the engine under a cylinder head valve cover. The air is exhausted so that it has to first proceed through the engine before reentering the atmosphere. The entrained oil mist is separated from the air via known crankcase ventilation mechanisms. In one example, the air may exit the crankcase and enter the intake air stream via the engine PCV system. In another example, air may exit the crankcase or enclosed area under a valve cover.

Between time $T_1$ and $T_2$, the vacuum pump draws air from the vacuum reservoir. As a result, the pressure in the vacuum reservoir decreases, thereby increasing the vacuum level within the vacuum reservoir.

At time $T_2$, pressure in the vacuum reservoir decreases to a level less than first threshold pressure level 206. When the pressure level of the vacuum reservoir reaches the first threshold pressure level 206 it may be judged that there is a desired level of vacuum so that the vacuum pump can be turned off. Therefore, the vacuum pump is commanded off at time $T_2$. Between time $T_2$ and $T_3$, pressure in the vacuum reservoir remains at or below first pressure level 206.

At time $T_3$, the engine begins to rotate and engine speed increases to a low level (e.g., 200 RPM) as the engine is cranked by a starter motor. Cranking the engine does not increase the vacuum reservoir pressure since check valves act to limit flow from the vacuum reservoir. Thus, the vacuum pump does not have to be operated during a particular engine starting sequence. However, as time approaches $T_4$, vacuum reservoir pressure begins to increase. The pressure increase may be related to one or more brake application and release events or to operation of another vacuum operated device.

At time $T_4$, pressure in the vacuum reservoir reaches the second pressure level 204 while the starter motor continues to crank the engine. Vacuum reservoir pressure reaching second pressure level 204 initiates a request for vacuum and the vacuum pump is turned on. Air is drawn from the vacuum reservoir when the vacuum pump is turned on. The vacuum pump stays on until pressure in the vacuum reservoir reaches the first pressure level 206 at time $T_5$. In this particular example, the vacuum pump remains on during cranking and during engine speed run-up (e.g., where engine speed increases from a crank speed to a desired idle speed during engine starting). However, in other examples the vacuum pump may be commanded off while the engine is rotating and below idle speed. The engine may be commanded on when engine speed reaches idle speed. Thus, in some examples, the vacuum pump can be deactivated during an engine start so that the vacuum pump does not affect the alternator load if the vacuum pump is electrically driven. In other examples, the vacuum pump can be activated during or before an engine start so that at least some engine vacuum is available at engine start.

At time $T_5$, engine speed has reached and exceeded desired engine idle speed 208. Pressure in the vacuum reservoir has also been reduced to the first pressure level 206 by the activated vacuum pump. As a result, the vacuum pump is deactivated.

Thus, FIG. 2 shows signals of interest during one example engine starting sequence. The vacuum pump control of FIG. 2 describes one vacuum pump operating sequence before and during an engine start for an electrically actuated vacuum pump. It can be seen that the vacuum pump may provide vacuum to a vacuum reservoir before engine operation. Further, the vacuum pump may be commanded on or off during engine run-up depending on the particular starting strategy. Since the air from the outlet of the vacuum pump is directed to the engine crankcase or into an interior region of the engine bounded by the cylinder head valve covers, engine oil used to wet vacuum pump seals can be directed to areas of the engine where oil can precipitate into the engine oil sump. Consequently, hydrocarbon emissions to the atmosphere can be reduced even when the engine is not operating.

Referring now to FIG. 3, a high level flowchart for adjusting operation of a vacuum control valve is shown. The method of FIG. 3 is executable by instructions of controller 12 of FIG. 1.

At 302, method 300 determines engine operating conditions. Engine operating conditions include but are not limited to engine speed, engine load, vacuum reservoir pressure, engine intake manifold pressure, intake throttle position, brake actuator position, and desired engine torque. Method 300 proceeds to 304 after engine operating conditions are determined.

At 304, method 300 judges whether or not vacuum is requested. In one example, vacuum may be requested when pressure in a vacuum reservoir is greater than first and second pressure level thresholds. For example, the first pressure level threshold may be a lower pressure threshold where vacuum level pressure is low enough where no additional reduction in vacuum pressure is desired. The second pressure level threshold may be a pressure threshold where when pressure in the vacuum reservoir exceeds the second pressure level threshold additional vacuum is requested. When pressure in the vacuum reservoir is between the first pressure level threshold and the second pressure level threshold, the vacuum pump may remain on or off. If the vacuum pump was shut off due to pressure in the vacuum reservoir being at or below the first pressure level threshold, the vacuum pump remains off until pressure in the vacuum reservoir reaches the second pressure level threshold. If the vacuum pump was turned on due to pressure in the vacuum reservoir being at or above the second pressure level threshold, the vacuum pump remains on until pressure in the vacuum reservoir reaches the first pressure level threshold. If method 300 judges a request for vacuum, method 300 proceeds to 306. Otherwise, method 300 proceeds to exit.

At 306, method 300 supplies engine oil to the vacuum pump. In one example, engine oil is supplied from the engine to the vacuum pump via the engine oil pump. In another example, engine oil is supplied to the vacuum pump via gravity feed. A valve may selectively allow engine oil to flow from the engine to the vacuum pump. The engine oil may be supplied to the vacuum pump to lubricate pump bearings and pump seals. A vacuum pump with oil wetted seals may improve vacuum pump efficiency as compared to vacuum pumps with dry seals. The oil may fill gaps in pump seals and may decrease vacuum pump friction.

At 308, method 300 draws air from a vacuum reservoir. The vacuum reservoir may be a stand-alone reservoir or it may be included with other components such as a vacuum reservoir in a brake booster. The vacuum pump draws air from the vacuum reservoir and thereby increases vacuum within the vacuum system. Method 300 proceeds to 310 as air is drawn from the vacuum reservoir.

At 310, method 300 exhausts air drawn from the vacuum reservoir via the vacuum pump to interior regions of the engine. In one example, the vacuum pump exhausts air from the vacuum reservoir to the engine crankcase. In another example, the vacuum pump exhausts air from the vacuum reservoir to the interior region of cylinder head valve covers. In other examples, air drawn from the vacuum reservoir may be directed to the engine intake manifold or intake air system. In this way, air drawn from the vacuum reservoir can be pumped into an interior region of the engine so that air does not directly flow to atmosphere. When air is evacuated from a vacuum reservoir and directed to an interior region of the engine, such at the crankcase or cylinder head valve covers, oil entrained in the air may be separated from the air. The air exhausted from the vacuum pump can be subsequently used in combustion of an air-fuel mixture. In this way, hydrocarbons may be processed through the engine and exhaust system to that fewer hydrocarbons may be put into the atmosphere. Method 300 exits after air from the vacuum pump is exhausted to an interior region of the engine.

Referring now to FIG. 4, a flowchart of a method for operating a vacuum pump during selected engine operating conditions is shown. The method of FIG. 4 is executable by instructions of controller 12 of FIG. 1.

At 402, method 400 determines engine operating conditions. Engine operating conditions include but are not limited to engine speed, engine load, vacuum reservoir pressure, engine intake manifold pressure, intake throttle position, brake actuator position, and desired engine torque. Method 400 proceeds to 404 after engine operating conditions are determined.

At 404, method 400 judges whether or not ignition key-on is present. A key-on condition may be indicated by an assertion of a switch such as an ignition switch or a start engine button. The key-on condition does not have to include engine cranking. However, the key-on condition may be indicative of a future intent to start the vehicle's engine. If method 400 judges no key-on is indicated, method 400 returns to 402. Otherwise, method 400 proceeds to 406.

At 406, method 400 judges whether or not there is a request to crank the engine. An engine crank request may be initiated by a key or other input to a controller, and the engine may be cranked via a starter motor or via an auxiliary motive device. If method 400 judges that there is an engine cranking request, method 400 proceeds to 408. Otherwise, method 400 proceeds to 422.

At 422, method 400 judges whether or not there is sufficient battery power to operate the vacuum pump. In one example, method 400 judges whether or not there is sufficient battery power to operate the vacuum pump based on battery voltage. In other examples, method 400 judges whether or not there is sufficient battery power to operate the vacuum pump based on an estimated battery state of charge. If method 400 judges that there is sufficient battery power to operate the vacuum pump, method 400 proceeds to 424. Otherwise, method 400 returns to 406. In this way, method 400 may conserve battery power for starting the engine rather than operating the vacuum pump.

At 424, method 400 judges whether or not a request for vacuum has been initiated. A vacuum request may be initiated in response to a pressure of a vacuum reservoir greater than a predetermined threshold pressure. In another example, a vacuum request may be initiated by activation or deactivation of a device of a vehicle. For example, a vacuum request may be initiated in response to activation or deactivation of a brake pedal. If vacuum is requested, method 400 proceeds to 426. Otherwise, method 400 proceeds to 428.

At 426, method 400 starts a vacuum pump and opens an engine oil supply to the vacuum pump. In one example, the vacuum pump may be activated via an electrical command such as activating a transistor or relay. The engine oil may be supplied to the vacuum pump by opening an electrically controlled valve. Air begins to be evacuated from a vacuum reservoir and the vacuum system when the vacuum pump is started. The vacuum pump also exhausts the air to an interior region of the engine such as the crankcase or interior of the cylinder head valve cover. Air exhausted by the vacuum pump to an interior region of the engine can be directed to engine cylinders via the PCV system. Removing the hydrocarbons from the air reduces the possibility of transferring hydrocarbons to atmosphere. Method 400 proceeds to 406 after the vacuum pump is started and after opening the engine oil supply to the vacuum pump.

At 428, the vacuum pump may be shut off or deactivated by opening a switch or a relay. The engine oil supply may be closed to the vacuum pump by closing an electrically controlled valve. Deactivating the vacuum pump stops air from being drawn from the vacuum reservoir by the vacuum pump. Method 400 returns to 406 after the vacuum pump is deactivated and the engine oil supply to the vacuum pump is closed.

At 408, method 400 judges whether or not there is sufficient battery power to crank the engine and operate the vacuum pump. In one example, method may allow the vacuum pump to operate as long as the battery voltage is greater than a predetermined threshold voltage. If the battery voltage is less than the predetermined threshold voltage before or during engine cranking, the vacuum pump may be commanded off. In other examples, method 400 may judge whether or not there is sufficient battery power to crank the engine and operate the vacuum pump in response to an estimated battery state of charge. If it is judged that there is sufficient battery power to crank the engine and operate the vacuum pump, method 400 proceeds to 410. Otherwise, method 400 proceeds to 430.

At 410, method 400 starts a vacuum pump, opens an engine oil supply to the vacuum pump, and cranks the engine. As described at 426, the vacuum pump exhausts the air to an interior region of the engine such as the crankcase or interior of the cylinder head valve cover. Further, air begins to be evacuated from a vacuum reservoir and the vacuum system when the vacuum pump is started. The vacuum pump also exhausts the air to an interior region of the engine such as the crankcase or interior of the cylinder head valve cover. Air exhausted by the vacuum pump to an interior region of the engine can be directed to engine cylinders via the PCV system. Method 400 proceeds to 412 after the vacuum pump is started and after opening the engine oil supply to the vacuum pump.

At 430, the vacuum pump may be shut off or deactivated by opening a switch or a relay. The engine oil supply may be closed to the vacuum pump by closing an electrically controlled valve. Deactivating the vacuum pump stops air from being drawn from the vacuum reservoir by the vacuum pump. Method 400 proceeds to 412 after the vacuum pump is deactivated and the engine oil supply to the vacuum pump is closed.

At 412, method 400 judges whether or not the engine is started. The engine may be judged to be started after the engine reaches a predetermined engine starting speed. For example, the engine may be determined to be started after a desired engine idle speed is exceeded. If method 400 judges that the engine is started, method 400 proceeds to 414. Otherwise, method 400 returns to 404.

At 414, method 400 judges whether or not vacuum is requested. As discussed at 408, a vacuum request may be initiated in response to a pressure of a vacuum reservoir greater than a predetermined threshold pressure. If vacuum is requested, method 400 proceeds to 416. Otherwise, method 400 proceeds to 432.

At 432, the vacuum pump may be shut off or deactivated by opening a switch or a relay. The engine oil supply may be closed to the vacuum pump by closing an electrically controlled valve. Deactivating the vacuum pump stops air from being drawn from the vacuum reservoir by the vacuum pump. Method 400 proceeds to 418 after the vacuum pump is deactivated and the engine oil supply to the vacuum pump is closed.

At 416, method 400 starts a vacuum pump and opens an engine oil supply to the vacuum pump. As described at 426 and 410, the vacuum pump exhausts the air to an interior region of the engine such as the crankcase or interior of the cylinder head valve cover. Further, air begins to be evacuated from a vacuum reservoir and the vacuum system when the vacuum pump is started. The vacuum pump also exhausts the air to an interior region of the engine such as the crankcase or interior of the cylinder head valve cover. Air exhausted by the vacuum pump to an interior region of the engine can be directed to engine cylinders via the PCV system. Method 400 proceeds to 418 after the vacuum pump is started and after opening the engine oil supply to the vacuum pump.

At 418, method 400 judges whether or not there is a request to stop the engine. The request may be initiated by an operator or by a system of the vehicle (e.g., a hybrid vehicle controller). If an engine stop request is not present, method 400 proceeds to 414. Otherwise, method 400 proceeds to 420.

At 420, method 400 stops the vacuum pump and closes the engine oil supply to the vacuum pump. The vacuum pump may be shut off or deactivated by opening a switch or a relay. The engine oil supply may be closed to the vacuum pump by closing an electrically controlled valve. Method 400 proceeds to exit after the vacuum pump is deactivated and the engine oil supply to the vacuum pump is closed.

Thus, the method of FIGS. 3-4 provide for a method for providing vacuum, comprising: pumping air from a vacuum reservoir to an interior region of an engine crankcase or an engine valve cover, the vacuum reservoir storing a medium for assisting an operator to apply brakes of a vehicle. The method further comprises routing air from the engine crankcase or engine valve cover to an engine cylinder and combusting a mixture of the air and fuel. The method includes where the air is pumped from the vacuum reservoir via an electrically driven pump. The method includes where the electrically driven pump is activated during a first engine start and deactivated during a second engine start. The method further comprises lubricating a pump with engine oil, the pump including an air inlet port coupled to the vacuum reservoir. The method includes where the electrically driven pump is activated in response to a pressure of the vacuum reservoir greater than a threshold pressure.

As will be appreciated by one of ordinary skill in the art, the methods described in FIGS. 3-4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. An engine vacuum system, comprising:
an engine;
an electrically driven vacuum pump in fluid communication with the engine and a vacuum reservoir, a vacuum pump exhaust port of the electrically driven vacuum pump in fluid communication with an oiled interior region of the engine, the vacuum reservoir supplying vacuum to a vacuum consumer; and
a controller including instructions for,
selectively activating the vacuum pump during engine cranking and run-up to idle speed to draw air from the vacuum reservoir and exhaust the air to the interior region of the engine.

2. The engine vacuum system of claim 1, where the electrically driven vacuum pump is located inside the engine and wherein the vacuum consumer is a brake booster.

3. The engine vacuum system of claim 1, where the electrically driven vacuum pump is located external of the engine.

4. The engine vacuum system of claim 1, where the oiled interior region is a crankcase or cylinder head valve cover, and further comprising a conduit configured to carry engine oil from the engine to the electrically driven vacuum pump.

5. The engine vacuum system of claim 4, further comprising a control valve located along a length of the conduit, and wherein the controller includes further instructions for opening the control valve responsive to activation of the vacuum pump and closing the control valve responsive to deactivation of the vacuum pump.

6. The engine vacuum system of claim 1, further comprising a conduit, the conduit coupling the electrically driven vacuum pump to the vacuum reservoir and a check valve.

7. The engine vacuum system of claim 6, wherein the controller includes further instructions to activate and deactivate the electrically driven vacuum pump in response to an air pressure within the vacuum reservoir.

8. The engine vacuum system of claim 7, wherein the engine is coupled to a battery in a hybrid vehicle, and wherein the controller includes additional instructions for judging whether or not to start the electrically driven vacuum pump during a start of the engine based on a state of charge of the battery.

9. An engine vacuum system, comprising:
an engine coupled to a battery in a hybrid vehicle;
an electrically operated vacuum pump;
a vacuum reservoir supplying vacuum to a vacuum consumer;
a conduit including an electrically actuated valve coupling an engine crankcase to the vacuum pump; and
a controller with computer readable instructions for,
  during an engine start,
    selectively activating the vacuum pump to exhaust air pumped from the vacuum reservoir into an interior region of the crankcase or cylinder valve cover of the engine; and
    selectively opening the valve to receive oil from the crankcase in the vacuum pump.

10. The engine vacuum system of claim 9, wherein the controller selectively activates the vacuum pump during the engine start based on each of a battery state of charge and a vacuum reservoir pressure.

11. The engine vacuum system of claim 9, further comprising an engine oil pump in the crankcase, wherein the conduit coupling the crankcase to the vacuum pump includes the conduit coupling the vacuum pump to the engine oil pump.

12. The engine vacuum system of claim 9, further comprising the conduit coupling an air output port of the vacuum pump to the crankcase or cylinder valve cover.

13. The engine vacuum system of claim 9, further comprising the conduit coupling an air inlet port of the vacuum pump to the vacuum reservoir.

* * * * *